INVENTOR
GRANVILLE J. HAHN

United States Patent Office 3,341,623
Patented Sept. 12, 1967

3,341,623
INHIBITING OFF-COLOR IN HOT-FORMING STYRENE POLYMERS BY ADDING ALKALINE SOLIDS
Granville J. Hahn, Big Spring, Tex., assignor to Cosden Oil & Chemical Company, Big Spring, Tex., a corporation of Delaware
Filed Jan. 3, 1964, Ser. No. 335,547
2 Claims. (Cl. 260—880)

This invention relates to color stabilization of hot-formed thermoplastics. More particularly, it relates to color stabilization of thermoplastics by adding trace quantities of alkaline solids to the molding material usually sufficient to raise the evolved vapors to a pH exceeding 3 and preferably in the range of about 4 to 8.

According to the present invention, it is found that moldable thermoplastic solids, which in their natural pure color varied from water white to milk white and which usually have been subjected to an acid wash and then dried in their final purification, tend to become discolored when heated during their hot-forming or molding. Such discoloring heat may be applied at an intermediate hot-forming stage, such as extrusion, to convert the raw polymer solids from powders, crumbs or beads, their form as polymerized, to larger fragments in which they are stored and shipped before final molding, or the discoloring can take place during ultimate hot-molding into desired shapes. The discoloration ranges through various degrees of color from a pinkish to sometimes greyish cast, variable somewhat with the particular thermoplastic substance, and is herein referred to as "off-white."

Particularly, solid polymers of ethylenically unsaturated monomer, typically styrene, methyl styrene, vinyl aromatics generally, and their high impact graft polymerization products, are produced by suspension polymerization in bead form which are contaminated by suspending agents and must be acid washed in their final purification. Alkaline earth phosphates as finely divided solids are usually used as solid suspending agents in their suspension polymerization and are removed by the final acid wash of the polymer beads. Dilute mineral acid is most commonly used to effect removal of such extraneous phosphate solids coating the product. The acid-treated polymer is thoroughly water washed and ultimately dried in warm air, but it still contains some "bound" moisture which is acidic. Usually the beads are then hot-formed by being extruded into larger particles such as pellets, a desirably useful form ready for final molding, but the beads could be converted into final molded products as desired.

During such hot extrusion or molding it is found that the extruded or molded product goes to an off-white color, as described, greatly depreciating the commercial value of the product and rendering it unacceptable for some highest quality products. While the present treatment most usually is applied to suspension polymerized beads, acid treated to remove insoluble mineral phosphate, the treatment may be applied to any form of polymer; for instance, precipitated polymer crumb or powder which by a final acid purification can give rise to substantially the same problem.

That variation in color-forming tendency from product to product may be due to molecular surface characteristics which tend, variably from product to product, to bind trace amounts of mineral acid upon the polymer particle surface during its purification, in a manner whereby all of the acid adsorbate is not removed in a hot gas drying. For instance, in the suspension polymerization of pure crystal styrene to form beads using calcium phosphate as suspending agent and finally washing with dilute hydrochloric acid for removal thereof, such dried beads when heated and extruded for cutting to pellets do not evolve acid vapors and have relatively little tendency to go off color. On the other hand, when applying the same suspension polymerization to a solution of styrene monomer with GRS rubber to form a graft polymer, the polymeric beads being again acid washed and then dried in hot air, such extrudate is substantially off-color with a pinkish cast, and the color is carried over into the final product molded from such pellets. In any case, where the fine molding solids tend upon hot-forming into pellets, larger extrusions, or final moldings to go off-color, it is found, according to the present invention, that the addition of trace quantities of alkaline solids will stabilize the molding against such discoloration during the hot-forming.

The acid character of the molding can be readily tested by condensing evolved moisture from the molding apparatus or extrusion chamber and measuring the pH thereof. It is found that a low pH, below about 3 and as low as 2, will give rise to substantial discoloration in the so hot-formed polymer, particularly of a styrene graft polymer. That tendency to discolor, it is found, is completely overcome, according to the present invention, by adding sufficient alkali solids, generally trace quantities, to raise the pH of the condensed vapors formed during the molding to the range stated; that is, above 3 and usually from 4 to about 8, preferably from 5 to 7.5. Such trace quantities of alkali range from about 15 to 150 grams per 1,000 pounds of molding solids, such as polymer beads, preferably in the range of 20 to 100 grams of alkali per 1,000 pounds of polymer.

The alkali is preferably in solid form and is one which is heat stable at the molding temperature; that is, it will not itself be gasified at the usual 250 to 500° F. molding temperature, selected individually for the particular plastic product being hot-formed. The best solid alkaline substances for this purpose are the oxides and hydroxides of the alkali forming metals both alkali and alkali earth metals, such as sodium and potassium oxides and hydroxide, calcium, barium, strontium and magnesium oxides, of which I prefer lime.

In practicing the invention, the molding powder has mixed therewith the dry alkali such as the lime in the requisite quantity, the alkali solids being metered in the stated quantities into the polymer solids to be molded; the blend is then passed to an extruder which thermally softens the beads under molding pressure to extrude continuous bars or strings, such as spaghetti-like thickness, which are continuously chopped by a cutter, as the extrudate is exuded from the extrusion die, into small pellets. Such extrusion device generally has a vent in the center of the compression barrel or chamber, and vented gases may be collected and condensed, the pH thereof being measured as a control upon the meter supplying the necessary quantity of lime into the bead mix.

The process is further explained in relation to the drawings in which.

Figure 1:
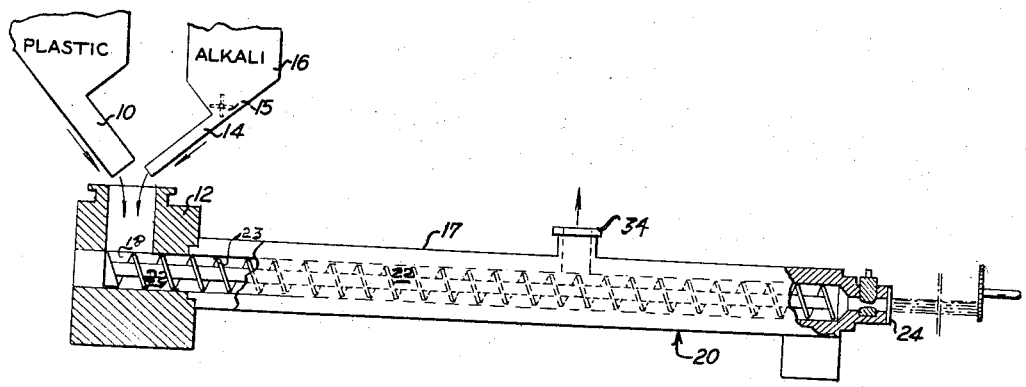
FIG. 1 shows diagrammatically a mixing hopper for mixing and supplying of molding solids to an extruder for hot-forming the plastic.
Figure 2:
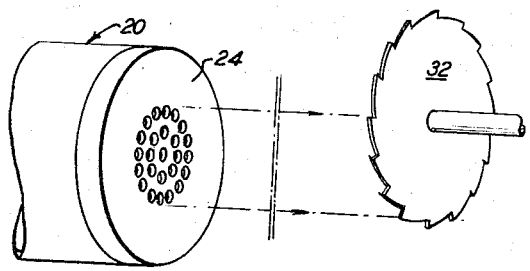
FIG. 2 shows a detail for cutting of extruding plastic into pellets.

In operation plastic beads formed as described below in Example 1 are poured from duct 10 into a mixing hopper 12 which stirs up the beads, mixing them homogeneously with alkali simultaneously metered into the hopper 12 from a duct 14 according to a metering device such as a slowly rotated star wheel 15 contained in a hopper 16. The blend of beads and alkali passes into the end 18 of the barrel 17 of an extrusion device 20 having rotary helical compression screw 23. The beads are mixed and pressed and heated in the extrusion chamber 22 by a heating jacket (not shown), the softened plastic passing out through an extrusion die 24. The thermally softened beads coalesce under the pressure of the rotating compression screw 23, the thermally softened plastic passing out of the numerous holes of the die 24 as continuous lengths of molded rods, like spaghetti. Immediately, or after the extruded rods have cooled and hardened in air somewhat, they are cut into short lengths like pellets by a rotating saw 32. Gases are evolved through vent 34 and are condensed by any conventional condenser (not shown).

The following examples will illustrate the practice of this invention.

*Example 1*

Polystyrene graft polymer beads produced by the process of U.S. Patents 3,047,534, July 31, 1962, and 3,068,192, Dec. 11, 1962, were washed in a hydrochloric acid solution of about 2–3 pH to assist in removing suspension chemicals and then conducted to a centrifuge wherein the beads were dewatered, rinsed with water, and again dewatered. The damp beads from the centrifuge were conveyed into a warm-air fluid bed dryer. Warm air was introduced into the dryer at about 200° F. and conducted through the beads to dry them to about 0.1 percent, by weight, moisture content. This residual moisture was essentially "bound" moisture, i.e., moisture associated with the beads as a result of the somewhat hygroscopic nature of the diene elastomer therein.

The dried beads were conveyed by a pneumatic conveyor to an extruded, having a moisture vent in the upper portion of the barrel. At its output end the extruder was fitted with a die having a multiplicity of holes through whch polystyrene was extruded into a number of continuous spaghetti-like thin strands or rods. The pressure near the die was about 1200 pounds per square inch and temperature of the polystyrene material about 450° F. The beads entered the mouth of the extruder from a small bead hopper and were heated as they moved along the barrel. A metering section was provided on the screw such that a homogeneous melt was obtained before the material passed the vent section. The feed section of the extruder was maintained at a temperature of about 250° F.

At the vent, pressure was essentially atmospheric. A vaporous material discharged from the vent and was condensed and tested for pH. In this example the condensate was found to have a pH of about 2.

The spaghetti-like strands of extruded polystyrene graft polymer leaving the extruder were conducted through a cold water bath and then through a pelletizer, wherein the continuous strands are cut into small pellet-like pieces.

The polystyrene product from the extruder in this example was observed to be a dingy, off-white color, probably best described as having a greyish cast.

*Example 2*

Pelleted polystyrene graft polymer was again formed as described in Example 1, except that 100 grams of powdered and finely divided calcium hydroxide for each 1000 pounds of beads were first mixed homogeneously and then introduced into the input hopper of the extruder as shown in the drawing. The product issuing from the extruder was found to have changed to a milk-white color as a result of the addition of the calcium hydroxide. The condensed vapor emitting from the vent had a pH of about 6.

*Example 3*

Example 2 was repeated in a number of tests but using 25 grams of calcium hydroxide per 1000 pounds of beads. The product was still found to be white, of acceptable color for commercial purposes, but the pH of the vapor emitting from the vent was about 4.

*Example 4*

Example 3 was repeated, but the calcium hydroxide was metered into the extruder at a rate of about 15 grams per 1000 pounds of beads, the rate being determined such that the pH of the vented vapor was about 3. The product was still found to be an acceptable white color, definitely improved over the color of the product of Example 1 where no calcium hydroxide was introduced.

*Example 5*

Example 4 was repeated, except that calcium hydroxide was added in quantity of about 5 grams per 1000 pounds of beads, and the pH of condensed vapor vented from the extruder was about 2. In this instance there was found to be substantially no improvement in the product color. It had an off-white color of greyish cast.

*Example 6*

Examples 2 through 5 were repeated, but the calcium hydroxide was metered into the hopper in the form of a saturated solution of same, the rate of flow being such as to provide, in each instance, the same weight calcium hydroxide as was provided in the comparable ones of Examples 2–5. The same results were obtained as for the comparable examples.

*Example 7*

Example 2 was repeated, except that 200 grams of calcium hydroxide were added per 1000 pounds of beads. The pH of condensate from the extruder vent was observed to be over 8. The product was off-white in color, having a yellowish, dingy cast.

*Example 8*

The process of Example 1 was repeated, but using a graft polymer of polystyrene consisting of polystyrene grafted upon polybutadiene, the particular polybutadiene being of the 1,4-addition type, and sterospecific, being a combination of cis and trans (about 35 percent cis-1,4 and 55 percent trans-1,4, with about 7–8 vinyl structure), the product further being substantially amorphous in character. The product from extrusion was found to be definitely off-white, having a distinct pinkish cast. The procedures of Examples 2 through 7 were repeated using this bead product for extrusion. It was found that substantially the same results occurred as for comparable Examples 2 through 7, except that in the instances when the pH of the vapor vented from the extruder was below about 3, the product was of pinkish instead of greyish cast.

As thus described, solid polymers which tend to go off color during hot-forming, and which evolve acidic vapors, are stabilized by treating the polymer solids before heating with alkaline materials; typically, alkali-forming metal oxides and hydroxides, in quantity sufficient to adjust the pH to the critical range of about 3 to 8, preferably 4 to 7.5. While the tendency to go off color appears to be due to evolution of acid, the actual source of the color is not determined, whether by discoloration of the polymeric thermoplastic substance per se, such as the styrene polymer component, or one of its additives, or copolymer substances including additives, that may be associated with the styrene. For instance, the color may result from the rubber component admixed with the styrene before polymerization in forming of a graft polymer, or it may be due to an anti-oxidant, or other modifying substances added in small quantity in the normal production of the particular polymer solids. Thus, in any case, it is found that the tendency of such polymeric solids to go off color is inhibited by the controlled addition of the stated small quantities of the alkaline material.

Certain modifications will occur to those skilled in the art, and it is accordingly intended that the description and drawings be regarded as illustrative and not limiting except as defined in the claims appended hereto.

I claim:

1. The process of inhibiting the development of off-white color in the hot-forming of dry, acid-treated beads of graft copolymer of styrene onto butadiene polymers which tend to evolve acidic vapors during the hot-forming, comprising adding to said beads sufficient dry powdered alkaline substance selected from the group consisting of oxides and hydroxides of alkali forming metals to raise the pH of the evaporated vapors to the range of about 3 to 8.

2. The process of inhibiting the development of off-white color in the hot-forming of dry, acid-treated beads of graft copolymer of styrene onto butadiene polymers which tend to evolve acidic vapors during the hot-forming, comprising adding sufficient lime in the range of about 15 to 150 grams per one thousand pounds of said graft polymer beads to raise the pH of the evolved vapors to the range of about 3 to 8.

References Cited

UNITED STATES PATENTS

| | | | |
|---|---|---|---|
| 2,483,959 | 10/1949 | Baer | 260—45.75 |
| 2,661,344 | 12/1953 | Slocombe et al. | 260—45.7 |
| 2,694,692 | 11/1954 | Amos et al. | 260—880 |
| 3,068,192 | 12/1962 | White | 260—880 |
| 3,147,232 | 9/1964 | Norman et al. | 260—45.7 |

FOREIGN PATENTS 127,445    4/1943    Australia.

MURRAY TILLMAN, *Primary Examiner.*

M. TULLY, *Assistant Examiner.*